United States Patent
Chakravarti et al.

[11] Patent Number: 5,987,112
[45] Date of Patent: Nov. 16, 1999

[54] INTERNATIONAL CALL BACK TECHNIQUE WITH REDUCED POST DIALING DELAY

[75] Inventors: Arvind S. Chakravarti, Marlboro; Edward D. Eng, South Plainfield; Chi K. Lam, Morganville; Yuk-Ming Lam, Colts Neck; Henry H. Shen, Middletown; Nancy Y. Tai, Red Bank, all of N.J.

[73] Assignee: AT&T Corp., New York, N.Y.

[21] Appl. No.: 08/922,344

[22] Filed: Sep. 3, 1997

[51] Int. Cl.⁶ .............................. H04M 1/64; H04M 3/48
[52] U.S. Cl. .................. 379/209; 379/207; 379/266; 379/221
[58] Field of Search ............................ 379/209, 266, 379/207, 219, 220, 221

[56] References Cited

U.S. PATENT DOCUMENTS

| | | | |
|---|---|---|---|
| 5,311,583 | 5/1994 | Friedes et al. | 379/209 |
| 5,311,585 | 5/1994 | Armstrong et al. | 379/221 |
| 5,724,404 | 3/1998 | Gaecia et al. | 379/34 |
| 5,883,964 | 3/1999 | Alleman | 379/205 |

FOREIGN PATENT DOCUMENTS

WO 91/01350  1/1992  European Pat. Off. .

*Primary Examiner*—Krista Zele
*Assistant Examiner*—David Huynh
*Attorney, Agent, or Firm*—Robert B. Levy

[57] ABSTRACT

A call-back service is disclosed having reduced post-dial delay. When a caller (12) initiates dialing of an international number of a called party (14), a dialer (28) monitors the dialed digits. Upon detecting a code corresponding to an international number, the dialer immediately launches a call to a node (16) in the caller's local exchange (18) while retaining the digits dialed by the calling party. The node then signals a call-back service platform (24) in a call back-country via a frame relay link (22) to launch a call through an ISDN network (26) back to the dialer. Thereafter, the dialer sends the digits to the call-back service platform which then launches a second call to the called party. The first and second calls are then bridged. By launching the call from the dialer upon detecting an international code in the number dialed by the calling party, the post dial delay is reduced.

10 Claims, 1 Drawing Sheet

INTERNATIONAL CALL BACK TECHNIQUE WITH REDUCED POST DIALING DELAY

TECHNICAL FIELD

This invention relates to a method for enabling a caller in one country initiating an international call to be called back by a telephone network in call-back country and to complete a call through that network with a minimum delay.

BACKGROUND ART

The revenue associated with international telecommunications traffic is divided between the originating and terminating telecommunications carriers or PTTs based on a settlement rate, representing the percentage of revenue allocated to the originating carrier or PTT. Some countries impose very high settlement rates to raise revenues for their PTTs. As a consequence, subscribers in such countries incur very high costs for international calls, prompting such subscribers to consider alternative mechanisms to enjoy lower telecommunications charges.

To the extent permitted by local law, many telecommunications subscribers utilize call-back services for their international calls to take advantage of lower settlement charges in the call-back country. For example, the settlement charges for a call originating in certain foreign countries and terminating in the United States may be far higher than a call originating in the United States and terminating in such countries. Thus, a subscriber gains a significant economic advantage by originating the call in the United States. To that end, some telecommunications carriers provide network facilities in low settlement rate countries that will call back a foreign caller upon receipt of an incoming international call from that caller. The foreign caller then enters the number of the called party, whereupon, the carrier in the low settlement rate country launches a second call to the called party. The two calls are the bridged. Because of the lower settlement charges, the "call back" to the foreign caller, and the call launched to the called party collectively cost less that if the caller made the call directly from the foreign country to the called party.

Presently, the call-back service offered by telecommunications carriers suffers from a significant post-dial delay, defined as the interval from dialing the number of the call back service until ringing of the called party. Often, the post dial delay may be as long as 25–30 second, causing some subscribers to believe that they were disconnected, so that the subscribers terminate their calls too early.

Thus, there is a need for a call back method that minimizes any post dial delay.

BRIEF SUMMARY OF THE INVENTION

Briefly, in accordance with the invention, foreign callers can enjoy a call back service having a minimum post-dial delay. To make use of the call-back service of the invention, a caller dials an international number associated with a called party. A dialer on the calling party's line monitors the dialed number, and upon detecting a prescribed code in the dialed number, (i.e., an international code, such as, 001), the dialer dials the number of a local node at the caller's local exchange. The dialer initiates the call to the local node while the caller is still dialing the number of the called party. The digits of the international number dialed by the caller are collected and held by the dialer. Upon receipt of the call from the dialer, the local node then signals a call-back service platform in a call-back country (e.g., the United States) via a high-speed communications link, such as a frame relay link. In response to the signal from the local node, the call-back service platform initiates a call back to the dialer via a combined voice and data network, such as an ISDN network. The local node then bridges the outbound call initiated by the dialer and the call back call initiated by the call-back country service platform. The dialer then transfers the digits of the number dialed by the caller to the call-back country service platform (as well as any account information entered by the caller) using a DTMF transfer protocol, such as the DTMF transfer protocol described in U.S. patent application Ser. No. 08/766,097, filed in the name of Chi K. Lam and assigned to AT&T (incorporated by reference herein). After receipt of the digits from the dialer, the call-back service platform dials the number of the called party. The called party's phone now rings and once that phone goes off-hook, the caller commences a conversation with the called party.

DETAILED DESCRIPTION

Figure 1:
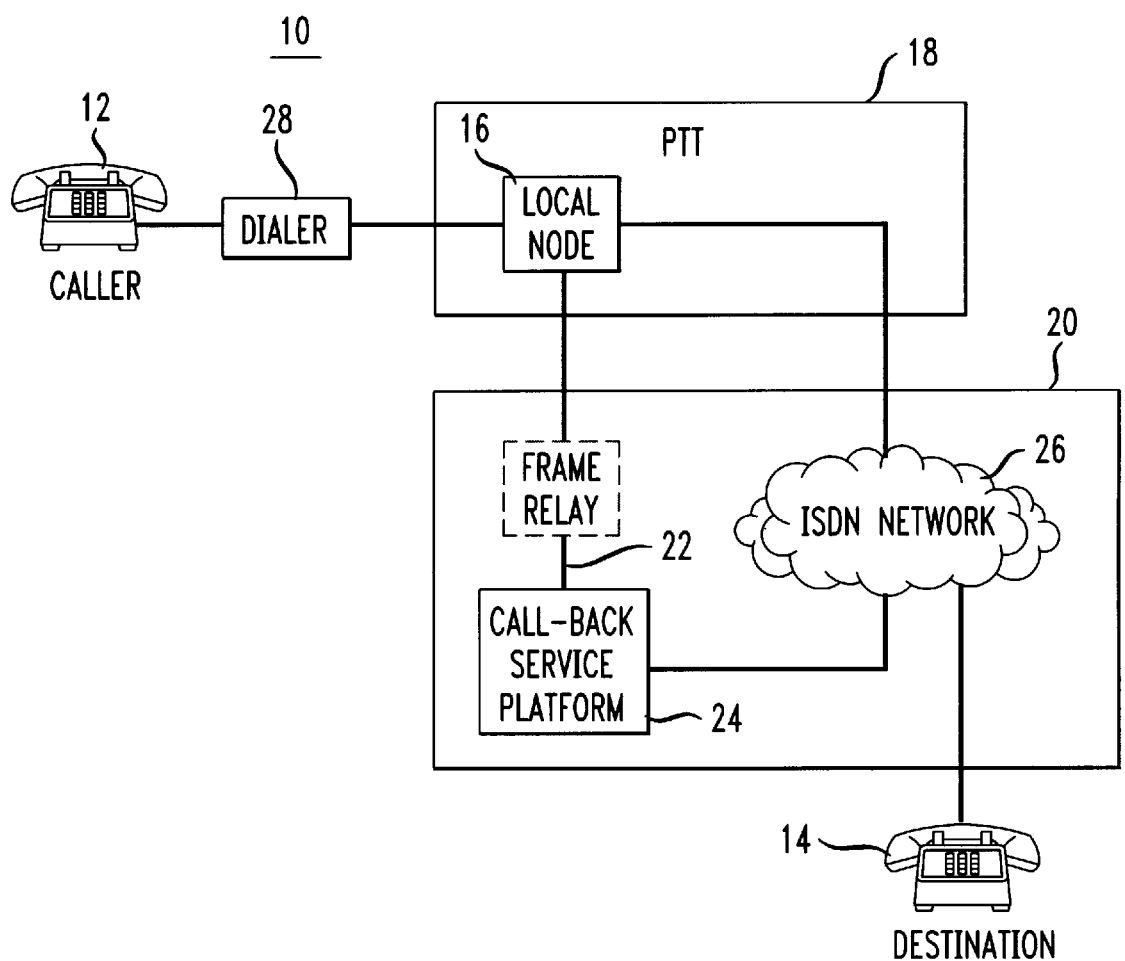
FIG. 1 is a block schematic diagram of a system for practicing the call-back method of the invention.

FIG. 1 illustrates a system 10, in accordance with the invention, for permitting a caller 12, situated in a first country, to place a call to a called party 14 in another country via a call-back service to take advantage of reduced costs associated with lower settlement rates in a call-back country. The system 10 includes a local node 16 resident within an exchange 18. The exchange 18 is maintained by a PTT or a private telecommunications carrier in the same country as the caller 12 to provide the caller with telecommunication service (i.e., dial tone).

The local node 16 represents a Point-of Presence (POP) of a telecommunications carrier, such as AT&T, that maintains a telecommunications network 20 in a call-back country, such as the United States having a low settlement rate with the first country (as compared to that country's rate with the U.S.) thereby making call-back economically feasible. Note that the called party 14, may reside, but need not necessarily reside, in the same country as the call-back country. As long as the settlement rate of the call-back country is low, as compared to the that of the country within which the called party resides, the call-back method is typically still economically feasible as to warrant its use by the calling party 12.

In accordance with one aspect of the invention, the local node 16 within the exchange 18 is linked via a high speed data link 22, typically a frame relay link, to a call-back service platform 24, such as a PABX or the like. In response to a signal from the local node 16 via the frame relay link 22, the call back-service platform service platform 24 automatically initiates a call back to the local node 16, via a combined voice and data network 26, typically an ISDN network. The network 26 also provides a link to the called party 14, directly, or more via networks (not shown).

To facilitate call-back in accordance with the invention, the caller 12 is connected to the exchange 18 through a dialer 28 that is responsive to the digits dialed by the caller. Ordinarily, the dialer 28 simply passes the digits dialed by the caller 12 to the exchange 18, unless the dialer detects a prescribed code in the dialed digit string, such as the code 001, corresponding to an international phone number. Upon detecting the prescribed code, the dialer 28 temporarily holds the digits dialed by the caller and instead, dials the number associated with the local node. 16.

Upon receipt of a call from the dialer 28, the local node 16 immediately signals the call-back service platform 24 through the frame relay link 22. Once signaled, the call-back service platform 24 launches a call back to the local node 16 via the ISDN network 26. The local node 16 now bridges the call back launched by the call-back service platform 24 with the call launched by the dialer 28. Thereafter, the dialer 28 then passes the digit string dialed by the caller 12 (corresponding to the number of the called party 14), along with any account information entered by the caller, to the call-back service platform 24 via the local node 16.

In practice, dialer 28 passes the dialed digit string to the call-back service platform 24 using the DTMF transfer protocol described the aforementioned in U.S. patent application Ser. No. 08/766,097 (incorporated by reference herein). As taught in that application, the receiving device (i.e., the call-back service platform 24) first sends a ready-to-receive signal in response to a set-up message from the local node 16. Upon receipt of the ready-to-receive signal, the local node 16 sends the string of DTMF signals, dialed by the calling party 12, preceded by M header digits, where M is an integer. The call-back service platform 24 receives the DTMF digits, and upon receipt of the $P^{th}$ digit in the data portion of the DTMF data string, the call-back service platform stops sending the ready-to receive signal. The call-back service platform 24 then strips the header digits to obtain the DTMF digits of interest. From the stripped DTMF digits, the call-back service platform 24 can determine whether the hand shake with the local node 16 is good and whether there is any echo that might adversely impact the quality of the received DTMF signals.

Assuming that the string of DTMF digits from the dialer 28 were correctly received (and the account information has been verified), the call-back service platform 24 then launches a call to the called party 14, causing that party's phone to ring. Once the called party 14 answers, the call-back service platform 24 bridges the call from the caller 12, thus permitting a conversation between the called and calling parties.

As compared to prior art call-back techniques, the call back technique of the invention achieves a reduced post-dial delay. Previously, a significant delay occurred between the dialing of the complete number by the caller and set-up of a connection with the local node 16. The call-back technique of the invention reduces this delay by employing the dialer 28 to immediately launch a call upon detecting an international code in the number dialed by the calling party. Further, the use of the frame relay data link 22 for carrying the signaling message from the local node 22 to the call-back-service platform 24 also results in minimal delay, as does the use of the ISDN network 26 to couple the call-back service platform to the local node 16 and to the called party 14.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for enabling a calling party in a first country to complete a call to a called party in a second country, comprising the steps of:
    monitoring a string of DTMF digits dialed by the calling party corresponding to an international number associated with a called party;
    launching a call from a dialer in communication with the calling party to a node in an exchange in the first country upon detection of a prescribed code within the string of digits dialed by the caller while temporarily retaining at the dialer the digits dialed by the calling party;
    signaling a call-back service platform in a call back country from the node in the exchange in the first country;
    launching a first call to the dialer from the call-back service platform;
    transferring the digits dialed by the caller and retained at the dialer to the call-back service platform;
    launching a second call from the call-back service platform to the called party in accordance with the transferred digits; and
    bridging the first and second calls to enable the calling party to communicate with the called party.

2. The method according to claim 1 wherein the signaling step comprises the step of sending a signal from the node to the call-back service platform via a frame relay link.

3. The method according to claim 1 wherein the first and second calls are launched through an ISDN network.

4. The method according to claim 1 wherein the prescribed code comprises a code associated with an international telephone call.

5. The method according to claim 1 wherein the digits are transferred using a DTMF protocol whereby:
    (a) the call-back service platform first sends a ready signal to the node;
    (b) the node sends the string of dialed digits to the call-back service platform preceded by a string of M header digits (where M is an integer);
    (c) the call-back service platform stops sending the ready signal after receiving a $P^{th}$ digit in the string of digits following the header digits; and
    (d) the call back service platform checks the dialed digits in accordance with the received header digits.

6. The method according to claim 1 wherein the call-back country and the second country are the same.

7. The method according to claim 1 wherein the call-back country and the second country are different.

8. A system for enabling a calling party in a first country to complete a call to a called party in a second party, comprising:
    a dialer for monitoring a string of DTMF digits dialed by the calling party corresponding to an international number associated with a called party and for launching a first call to a node in an exchange in the first country upon detection of a prescribed code within the string of digits dialed by the caller while temporarily retaining at the dialer the digits dialed by the calling party;
    a call-back service platform in a call back country, the platform being capable of initiating a first call to the calling party and for launching a second call to the called party and for bridging the first and second calls;
    a signaling link for coupling the local node to the call-back service platform to signal the call-back service platform to launch a first call to the dialer from the call-back service platform and for transferring the digits retained by the dialer to the call-back service platform; and
    a network for coupling the call-back service platform to the node and to the called party for carrying the first call launched by the call-back service platform to the dialer and for carrying the second call to the called party.

9. The system according to claim 8 wherein the signaling link comprises a frame relay link.

10. The system according to claim 8 wherein the network comprises an ISDN network.

* * * * *